Nov. 18, 1958  F. L. O. ROEHRIG  2,860,558
DUPLEX CAMERA SHUTTER
Filed Nov. 3, 1953
Fig. 1.
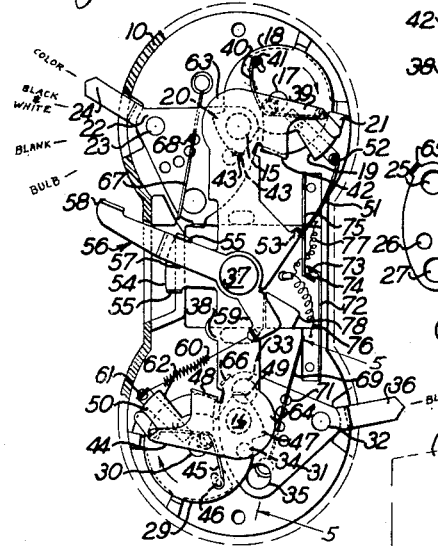
Fig. 6.
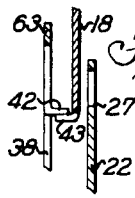
Fig. 2.
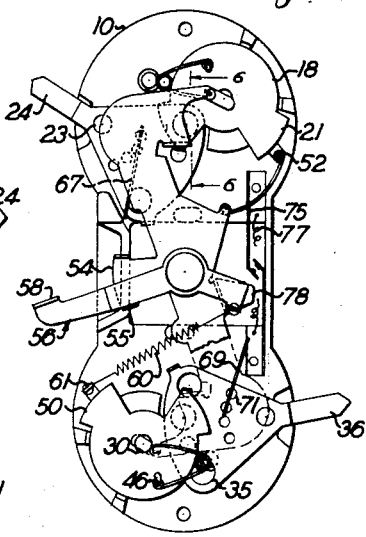
Fig. 8.
Fig. 4.
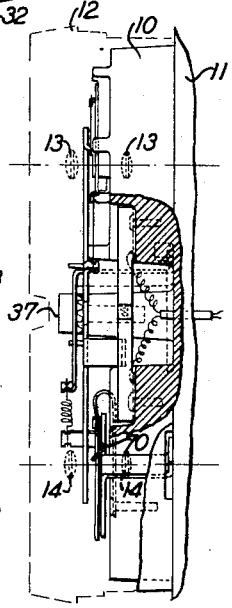
Fig. 3.
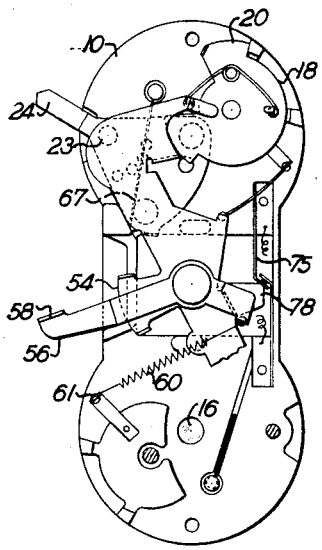
Fig. 7.
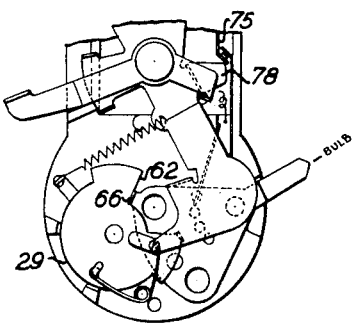
Fig. 5.
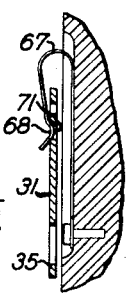
INVENTOR.
Frederick L. O. Roehrig.
BY
Herbert J. Jacobi
ATTORNEY.

United States Patent Office 2,860,558
Patented Nov. 18, 1958

2,860,558

DUPLEX CAMERA SHUTTER

Frederick L. O. Roehrig, Redlands, Calif.

Application November 3, 1953, Serial No. 389,947

2 Claims. (Cl. 95—18)

This invention relates to photography and more particularly to a duplex shutter mechanism for use on a camera having two lenses in which two separate pictures may be taken simultaneously or independently.

In the field of photography, particularly as practiced by amateurs, it is highly desirable to provide a camera which may be utilized for taking stereo pictures in either black and white or color pictures may be obtained. Frequently the photographer will wish to take one picture in black and white and almost immediately thereafter, another picture in color and a single camera which will accomplish this result is far superior and less cumbersome than the prior method of utilizing two separate cameras.

Since the camera with which the shutter mechanism of the present invention is intended to operate is provided with two separate lens systems and with two separate films, the adaptation of a shutter mechanism to expose the two films simultaneously or to selectively expose one or the other, is greatly facilitated. This operates to provide in a single camera, three functions which heretofore, were provided by three separate cameras, these functions being stereo pictures, black and white pictures and color pictures.

It is therefore, an object of this invention to provide a duplex shutter mechanism which may be actuated to simultaneously expose two separate films.

A further object of the invention is the provision of a duplex shutter mechanism which may be actuated to selectively expose one or the other of two separate films.

A still further object of the invention is the provision of a duplex shutter mechanism which may be actuated to selectively expose one or the other of two separate films and in which the exposure may be varied in accordance with the type of film and light conditions.

Another object of the invention is the provision of a duplex shutter mechanism which may be actuated to simultaneously expose two separate films or to selectively expose one or the other of the films, together with mechanism for synchronizing the operation of a flash bulb.

A further object of the invention is the provision of a duplex shutter mechanism in which the exposure time as determined by the operation of the shutter will always be the same.

A still further object of the invention is the provision of a duplex shutter mechanism which may be actuated to simultaneously expose two films or two parts of the same film, or may be actuated to selectively expose either one of two separate films, which shutter may be economically constructed from readily available materials whereby the same may be utilized on relatively inexpensive cameras and sold in a highly competitive market.

Further objects and advantages of the invention will be apparent from the following description taken in conjunction with the accompanying drawing wherein:

Fig. 1 is a top plan view of the shutter mechanism with parts in section for greater clarity;

Fig. 2, a view similar to Fig. 1 with the parts in position just prior to tripping of the shutters and with certain parts broken away for greater clarity;

Fig. 3, a view similar to Fig. 2 with the parts in position immediately after tripping of the shutters;

Fig. 4, a side elevational view of the shutter mechanism shown in Fig. 1 and with parts in section for greater clarity;

Fig. 5, a fragmentary sectional view on the line 5—5 of Fig. 1 and showing the exposure selector vane;

Fig. 6, a fragmentary sectional view on the line 6—6 of Fig. 2 and showing the means for synchronizing operation of the shutters and for maintaining the shutter speed constant;

Fig. 7, a fragmentary top plan view showing the operation of the mechanism with the selector vane set for a bulb exposure; and Fig. 8, a top plan view of one of the selector vanes.

With continued reference to the drawing there is shown a shutter base 10 which may be formed of plastic or metal by die-casting or any other suitable operation, which base may be secured to a camera body 11 and covered by a housing 12. Lenses 13 may be supported in any convenient manner and are disposed to conduct light rays to the sensitized surface of a film positioned in the camera body 11. A second set of lenses 14 may likewise, be supported in any convenient manner and serve to conduct light rays to the sensitized surface of a second film, positioned in camera body 11.

The shutter base 10 is provided with an aperture 15 extending therethrough which is in alignment with the lenses 13 and a second aperture 16 extending therethrough, which is in alignment with the lenses 14. Apertures 15 and 16 constitute light conducting paths and the shutter mechanism of this invention is designed to open and close these apertures as occasion demands.

A stud 17 extends from the shutter base 10 to one side of the aperture 15 and rotatably mounted on stud 17 is a shutter 18 in the form of a generally circular disc. Shutter 18 is provided with an arcuate notch 19 and with projecting portions 20 and 21 on each side thereof, the purpose of which will be presently described.

Disposed between the shutter 18 and the shutter base 10 is a selector vane 22 which is pivotally mounted on a stud 23 projecting from the base 10. The vane 22 is provided at one end with a finger engaging lever 24 which projects outwardly of the base 10 and, as shown in Fig. 8, the vane 22 is provided with a large aperture 25, a small aperture 26 and a second large aperture 27. The space between the apertures 25 and 26 is imperforate. The vane 22 is also provided with a plurality of spaced relatively small apertures 28, the purpose of which will be presently described. The vane 22 is disposed with the portion thereof containing the apertures 25, 26 and 27 between the shutter 18 and the base 10 and the apertures 25, 26 and 27 are adapted to be selectively positioned in alignment with the aperture 15 in the base 10. As shown in Fig. 1, the aperture 27 is in alignment with the aperture 15 and in this position the shutter provides a correct exposure for color film. If it is desired to expose black and white film, the vane 22 is moved to bring the aperture 26 into alignment with the aperture 15.

A second shutter 29 identical with the shutter 18 is rotatably mounted on a stud 30 projecting from the base 10 adjacent the aperture 16 and a selector vane 31 identical with the selector vane 22 is pivotally mounted on a stud 32 adjacent the aperture 16, the shutter 29 and vane 31 occupying the same relative positions as the shutter 18 and vane 22. Shutter 31 is provided with a large aperture 33, a small aperture 34 and a second large aperture 35. The space between apertures 34 and 33 is imperforate as in vane 22. Vane 31 is also provided with a finger engaging lever 36 which may be actuated to position the appropriate aperture 33, 34 or 35 in alignment with the aperture 16 in the base 10.

A stud 37 projects from the base 10 midway between the apertures 15 and 16 and pivotally mounted on stud 37 is a shutter operating bar 38. Bar 38 is provided at one end thereof with an offset portion 39 to which is attached an over-center spring 40 the opposite end of the spring 40 being attached at 41 to the shutter 18. With the bar 38 in the position shown in Fig. 1, the shutter 18 will be maintained in a position with the projecting portion 20 disposed over the aperture 15 thus preventing the transmission of light therethrough. The laterally extending portion 39 of the bar 38 is provided with an offset lip 42 which cooperates with an offset lip 43 on the projecting portion 20 of the shutter 18 in a manner to be presently described.

The opposite end of bar 38 is provided with a laterally extending portion 44 to which is attached an over-center spring 45, the opposite end of this spring being secured at 46 to the shutter 29. With the bar 38 in the position shown in Fig. 1 the projecting portion 47 is disposed over the aperture 16 and prevents transmission of light therethrough. The laterally extending portion 44 is provided with an offset lip 48 which serves to cooperate with an offset lip 49 extending from the projection 47 of the shutter 29 in a manner to be presently described. Shutter 29 is also provided with a projecting portion 50 which is similar to the projecting portion 21 of shutter 18. The bar 38 is normally maintained in the position shown in Fig. 1 by a spring 51 secured at one end to a tab 52 projecting from the base 10 and at the opposite end 53 to the bar 38.

The bar 38 is provided centrally thereof with a laterally extending arm 54 which in turn is provided with spaced offset lips 55. Pivotally mounted on the stud 37 is a shutter operating lever 56 having a portion 57 disposed between the offset lips 55 and a finger engaging portion 58 at the outer end thereof. The opposite end 59 of the lever 56 projects beyond the stud 37 and to this end 59 is attached a tension spring 60, the opposite end 61 of which is secured to a tab projecting from the base 10. Spring 60 serves to resiliently maintain the lever 56 in the position shown in Fig. 1 with the edge of the lever in engagement with the right hand offset lip 55 on the laterally extending arm 54 of the bar 38.

If it is desired to simultaneously expose two color pictures, the vane 22 will be set in the position shown in Fig. 1 with the aperture 27 in alignment with the aperture 15 and the vane 31 will be set with the aperture 35 in alignment with the aperture 16. When it is desired to trip the shutters 18 and 29 the lever 56 is moved counter-clockwise as viewed in Fig. 1, which will cause the edge thereof to contact the left hand offset lip 55 on the laterally extending arm 54 of the bar 38 and move the bar 38 against the action of spring 51 counter-clockwise to the position shown in Fig. 3. During this movement of the bar 38 the over-center springs 40 and 45 will be tensioned in a manner tending to rotate the shutters 18 and 29 in a clockwise direction, as shown by the arrows, but rotation of shutters 18 and 29 will be prevented by engagement of the lip 43 on shutter 18 with lip 42 on the bar 38 and by engagement of the lip 49 on shutter 29 with the lip 48 on bar 38, as shown in Fig. 2. Upon completion of the counter-clockwise movement of bar 38 to the position shown in Fig. 3, the lips above mentioned will be disengaged and the shutters 18 and 29 will simultaneously rotate to the position shown in Fig. 3, with a snap action caused by the over-center springs 40 and 45. This rotational movement of the shutters 18 and 29 results in moving the arcuate notch 19 in the shutter 18 across the aperture 15 and the arcuate notch 62 in the shutter 29 across the aperture 16 which will result in simultaneously exposing the two films located behind these apertures. Return movement of the bar 38 to the position shown in Fig. 1 under the action of spring 51 will also result in returning the shutters 18 and 29 to the position shown in Fig. 1 and during this return movement, the apertures 16 and 15 will be covered by the end portions 63 and 64 of the bar 38, in order to prevent double exposure of the films.

Should it be desired to take simultaneous black and white pictures, the apertures 26 and 34 in the selector vanes 22 and 31 will be positioned in alignment with the apertures 15 and 16 and the shutter mechanism operated as above described. If it is desired to expose only a single film, the appropriate selector vane 22 or 31 is moved to a position with the imperforate portion disposed over the adjacent aperture 15 or 16 and the shutter mechanism operated to expose either one of the films.

The shutter mechanism of this invention is also provided with means whereby a bulb exposure of either or both films may be made and for this purpose, the vanes 22 and 31 may be provided with offset lips 65 and 66, which with the selector vane disposed in the position shown in Fig. 7, causes the lip 65 or lip 66 to engage the edge of the arcuate notch 19 or 62 in the shutters 18 or 29 to hold the shutter in a position with the notch disposed over the adjacent aperture 15 or 16 upon movement of the lever 56 to the position shown in Fig. 3, thus exposing the film for as long a time as the lever 56 is held in this position. Upon return of the lever 56 to the position shown in Fig. 1, the shutters will be returned to closed position as shown in Fig. 1.

In order that the vane 22 will remain in adjusted position a spring detent 67 is secured to the body 10 and is provided with a curved end portion 68 which selectively engages the apertures 28 in the vane 22. Likewise, a spring detent 69 is secured to the body 10 and is provided with a curved end 70 for selectively engaging the apertures 71 in the vane 31. The details of this structure are best shown in Fig. 5.

Since it is frequently desirable to utilize a flash bulb for the purpose of obtaining sufficient illumination to properly expose the film and since such flash bulb must be operated in absolute synchronism with the operation of the shutter, means is provided in the shutter mechanism of this invention to accomplish such synchronization. This means may well comprise a fixed contact 72 secured to the base 10 and having a contact point 73 which is intended to cooperate with a movable contact point 74 carried by a contact spring 75 secured to the base 10. Contacts 73 and 74 are connected by conductors 76 and 77 to the electrical circuit of the flash bulb. The shutter actuating bar 38 is provided with a lateral projection 78 and as shown in Figs. 3 and 7, when the operating lever 56 has been moved counter-clockwise to the position shown in these figures, the projection 78 engages the contact spring 75 to move the contact 74 into engagement with the contact 73, thus energizing the flash bulb circuit simultaneously with the operation of the shutters 18 and 29.

It will be seen, that by the above described invention there has been provided a foolproof duplex shutter mechanism, which may be conveniently set for simultaneously exposing two films, for exposing either film or for taking a bulb exposure and likewise, the exposure time may be varied in accordance with the film used and light conditions. The action of the shutter mechanism is positive and does not depend upon any particular loading of a spring and furthermore, all of the parts may be conveniently and economically manufactured by relatively simple die-casting and stamping operations. The assembly of the parts is relatively simple and the entire manufacture may be accomplished by relatively unskilled labor, thus resulting in a device which may be utilized on relatively inexpensive cameras and sold in a highly competitive market.

What is claimed is:

1. A duplex camera shutter comprising a base, spaced apertures extending through said base, a shutter rotatably mounted on said base adjacent each aperture with a portion of each shutter overlying the adjacent aperture, an arcuate notch in each shutter, a stud projecting from said base midway between said spaced apertures therein, a shutter operating bar pivotally mounted on said stud, each end of said bar having an enlargement overlying the adjacent shutter and aperture in said base when said bar is in inoperative position, spring means for urging said bar toward inoperative position, an over-center spring connecting each end of said bar and the adjacent shutter, a laterally projecting lip on each shutter and a cooperating lip on each end of said bar, an arm extending laterally from said bar, spaced offset lips on said arm, an operating lever pivotally mounted on said stud and disposed between said offset lips, a finger engaging portion on said lever disposed outwardly of said base, a tension spring for urging said lever in one direction whereby upon movement of said lever in the opposite direction the same will engage one of said offset lips and move said bar in the same direction to load said over-center springs, the lips on said shutters engaging the lips on said bar to prevent movement of said shutters, continued movement of said bar disengaging the lips thereon from the lips on said shutters to permit movement thereof with a snap action thereby moving said arcuate notches by the apertures in said base to make an exposure, return movement of said bar loading said over-center springs in the opposite direction to return said shutters to original position with the enlargement of each end of said bar overlying the adjacent aperture in said base to prevent an exposure during return movement of said shutters.

2. A duplex camera shutter comprising a base, spaced apertures extending through said base, a shutter rotatably mounted on said base adjacent each aperture with a portion of each shutter overlying the adjacent aperture, a notch in each shutter, a stud projecting from said base midway between said spaced apertures therein, a shutter operating bar pivotally mounted on said stud, each end of said bar having an enlargement overlying the adjacent shutter and aperture in said base when said bar is in inoperative position, resilient means for urging said bar toward inoperative position, an over-center spring connecting each end of said bar and the adjacent shutter, a laterally projecting lip on each shutter and a cooperating lip on each end of said bar, an arm extending laterally from said bar, spaced offset lips on said arm, an operating lever pivotally mounted on said stud and disposed between said offset lips, a finger engaging portion on said lever disposed outwardly of said base, resilient means for urging said lever in one direction whereby upon movement of said lever in the opposite direction the same will engage one of said offset lips and move said bar in the same direction to load said over-center springs, the lips on said shutters engaging the lips on said bar to prevent movement of said shutters, continued movement of said bar disengaging the lips thereon from the lips on said shutters to permit movement thereof with a snap action thereby moving said arcuate notches by the apertures in said base to make an exposure, return movement of said bar loading said over-center springs in the opposite direction to return said shutters to original position with the enlargement on each end of said bar overlying the adjacent aperture in said base to prevent an exposure during return movement of said shutters.

References Cited in the file of this patent

UNITED STATES PATENTS

| Number | Name | Date |
|---|---|---|
| 738,066 | Reichenbach | Sept. 1, 1903 |
| 2,051,225 | Riddell | Aug. 18, 1936 |
| 2,053,513 | Blattner | Sept. 8, 1936 |
| 2,196,604 | Galter | Apr. 9, 1940 |
| 2,361,661 | Sparling | Oct. 31, 1944 |
| 2,443,208 | Thralls | June 15, 1948 |
| 2,505,140 | Peltz et al. | Apr. 25, 1950 |
| 2,541,555 | Sorkin | Feb. 13, 1951 |